(12) United States Patent
Masanek, Jr. et al.

(10) Patent No.: US 12,491,823 B2
(45) Date of Patent: Dec. 9, 2025

(54) TRUCK BED LINER WITH CUSHIONING ELEMENTS

(71) Applicant: MACNEIL IP LLC, Bolingbrook, IL (US)

(72) Inventors: Frederick W. Masanek, Jr., Barrington, IL (US); Andrzej Bunda, St. John, IN (US)

(73) Assignee: MACNEIL IP LLC, Bolingbrook, IL (US)

( * ) Notice: Subject to any disclaimer, the term of this patent is extended or adjusted under 35 U.S.C. 154(b) by 363 days.

(21) Appl. No.: 17/959,715

(22) Filed: Oct. 4, 2022

(65) Prior Publication Data
US 2024/0109500 A1    Apr. 4, 2024

(51) Int. Cl.
*B60R 13/01*    (2006.01)

(52) U.S. Cl.
CPC ........ *B60R 13/01* (2013.01); *B60R 2013/016* (2013.01)

(58) Field of Classification Search
CPC .. B60R 13/01; B60R 13/011; B60R 2013/016
USPC ................................ 296/39.1, 39.2
See application file for complete search history.

(56) References Cited

U.S. PATENT DOCUMENTS

| | | |
|---|---|---|
| 2,188,342 A | 1/1940 | England |
| 2,709,105 A | 5/1955 | Kramer |
| 3,149,875 A | 9/1964 | Stata |
| 3,387,315 A | 6/1968 | Stata |
| 3,390,912 A | 7/1968 | Stata |
| 3,450,429 A | 6/1969 | Stata |
| 3,488,081 A | 1/1970 | Nolen |
| 4,280,729 A | 7/1981 | Morawski |
| 4,406,492 A | 9/1983 | Cackowski |
| D278,525 S | 4/1985 | Morawski |
| D288,799 S | 3/1987 | Peress |
| 4,693,507 A | 9/1987 | Dresen et al. |

(Continued)

FOREIGN PATENT DOCUMENTS

| | | |
|---|---|---|
| CA | 1101016 A | 5/1981 |
| CA | 1198466 A | 12/1985 |

(Continued)

OTHER PUBLICATIONS

Advertisement for Highland's Black Armor Floor Guard, Stylin Concepts Custom Truck Accessories: catalog, 2003, pp. 1, 2 and 109.

(Continued)

*Primary Examiner* — Jason S Daniels
(74) *Attorney, Agent, or Firm* — Perkins IP Law Group LLC; Jefferson Perkins

(57) ABSTRACT

A truck bed liner is integrally molded of a thermoplastic material. Arrays of spaced-apart, endless cushioning elements downwardly depend from the bottom surface of the liner body. Notches are made in the bottom margins of the cushioning elements to permit fluid ingress to and egress from the cushioning element interiors. In one embodiment, the depth of the elements is uniform, and the top surface of the bed liner emulates the rib pattern of the truck bed. In another embodiment, the depth of the elements varies, such that a rib pattern on the top surface of the liner body can be different from the truck bed rib pattern.

22 Claims, 9 Drawing Sheets

(56) References Cited

U.S. PATENT DOCUMENTS

| | | | |
|---|---|---|---|
| D342,932 S | 1/1994 | Primeau | |
| D358,571 S | 5/1995 | Thundercloud | |
| D377,780 S | 2/1997 | MacNeil | |
| D394,037 S | 5/1998 | Mauffette | |
| 5,776,583 A | 7/1998 | Peyton | |
| 5,806,909 A * | 9/1998 | Wise | B60R 13/01 |
| | | | 296/97.23 |
| D420,965 S | 2/2000 | Iacovelli et al. | |
| 6,027,782 A | 2/2000 | Sherman | |
| D422,256 S | 4/2000 | Lu | |
| D432,478 S | 10/2000 | Lu | |
| D442,530 S | 5/2001 | Lu | |
| 6,261,667 B1 | 7/2001 | Yang | |
| D454,323 S | 3/2002 | Lu | |
| D454,324 S | 3/2002 | Lu | |
| 6,431,629 B1 | 8/2002 | Emery | |
| 6,534,146 B1 | 3/2003 | Mentz, Jr. | |
| 6,578,896 B1 | 6/2003 | Peterson | |
| 6,605,333 B2 | 8/2003 | Ferreira et al. | |
| 6,677,027 B1 | 1/2004 | Lu | |
| 6,793,872 B1 | 9/2004 | Buss | |
| 6,794,013 B1 | 9/2004 | Iacovelli et al. | |
| D499,057 S | 11/2004 | Lafleur | |
| 6,953,545 B1 | 10/2005 | Tyler | |
| D525,576 S | 7/2006 | Lu | |
| 7,316,847 B2 | 1/2008 | MacNeil | |
| 8,276,967 B1 * | 10/2012 | Ming-Shun | B60R 13/01 |
| | | | 296/97.23 |
| 8,382,186 B2 | 2/2013 | MacNeil et al. | |
| 11,407,365 B2 * | 8/2022 | Stien | B60R 13/01 |
| 11,643,025 B2 * | 5/2023 | Nardella, Sr. | B60R 13/01 |
| | | | 296/39.1 |
| 12,145,655 B1 * | 11/2024 | Pennington | B32B 3/30 |
| 2004/0048036 A1 | 3/2004 | Nakasuji et al. | |
| 2007/0110950 A1 | 5/2007 | Yang | |
| 2008/0277959 A1 * | 11/2008 | Boddie | B60R 13/01 |
| | | | 296/39.2 |

FOREIGN PATENT DOCUMENTS

| | | |
|---|---|---|
| CA | 1292028 A | 11/1991 |
| CA | 1302459 | 6/1992 |
| CA | 2431099 A | 1/2004 |
| JP | 11268570 A | 10/1999 |
| WO | 9534443 A1 | 12/1995 |

OTHER PUBLICATIONS

Volvo Accessories brochure, 1990, pp. 1 and 23.

Photographs of a Husky Liner floor tray with unknown manufacture date, obtained by Applicant in 2010, and believed to be on sale and in public use prior to Oct. 29, 2003.

Web advertisement for Fox Weatherboots, foxweatherboots.com (as downloaded by web.archive.org), Mar. 3, 2000.

"Bagagerumsmattor" downloaded from http://www.autoform.se/sv/produkter_bagagerumsmattor.htm on Oct. 20, 2004.

"Techliner" for a 2021 Ford F-150 offered for sale by Weathertech.com at http://www.weathertech.com/ford/2021/f-150/techliner-bed-tailgate-protection/f-150-box-size/8-box/f-150-onboard-generator/no/f-150-tailgate-work-surface/no/, downloaded Sep. 22, 2022.

"Underliner" for 2014 Ford F-150 offered for sale by Weathertech.com at http://www.weathertech.com/ford/2014/f-150/underliner-bed-liner/box-size/8/, downloaded Sep. 22, 2022.

* cited by examiner

TRUCK BED LINER WITH CUSHIONING ELEMENTS

BACKGROUND OF THE INVENTION

Pickup truck beds usually are formed of stamped steel and painted. As such, they are susceptible to scratches, dents and rust due to the impact on their top surfaces of heavy and/or abrasive objects, such as lumber or bricks. Three kinds of liners have been developed to ameliorate damage to pickup truck beds. Spray-on liners exactly conform to the pickup truck bed contours, but are expensive and are best installed by professionals. Drop-in liners are formed from plastic sheets such as polyethylene, but offer only limited protection from impacts of heavy objects dropped onto the bed surface. Bed mats are two-dimensional expanses of a cushioning material such as carpeting or foamed polyurethane. They may be used in the place of or in addition to a drop-in bed liner.

All other things being equal, the thicker a bed liner is, the more protection from impacts it will provide. But as the bed liner gets thicker, it gets bulkier and heavier, creating problems for shipment and installation. It is desirable to ship aftermarket bed liners as a rolled-up tube, and this imposes constraints on how bulky and inflexible a bed liner can be. Preformed aftermarket bed liners typically are thermoformed from plastic sheets of uniform thickness in one-sided molds, and this manufacturing technique imposes constraints on the design of current bed liners; in general, the top surface of a conventional thermoformed drop-in bed liner must be an analog or mathematical projection of the bottom surface.

SUMMARY OF THE INVENTION

According to one aspect of the invention, a vehicle bed liner, such as a pickup truck bed liner, comprises a body that is integrally molded of an elastomer. A plurality of spaced-apart cushioning elements are integrally molded with the body and downwardly depend from a lower surface thereof. In one embodiment, each of the cushioning elements is endless when viewed in a horizontal plane. For example, each cushioning element may be circular.

In one embodiment, an endless wall of each of the cushioning elements has a bottom margin that conforms to a horizontal plane. At least one notch is formed in the endless wall such that the bottom margin of the endless wall is not continuous. Therefore, an interior of the cushioning element, as defined by the endless wall, will not be sealed to the vehicle bed. Instead the notch will permit the ingress and egress of fluid, such as air and water, to and from the element interior. In one embodiment, there are two such notches in the cushioning element wall, angularly spaced apart from each other around an element axis.

According to another aspect of the invention, a vehicle bed/vehicle bed liner system includes a vehicle bed (such as a pickup truck bed) with a bed floor that is substantially disposed in a horizontal plane. The vehicle bed has a plurality of elongate, spaced-apart ribs that upwardly protrude from the bed floor. Each of the vehicle bed ribs has a flat top and sloped sides that are disposed between the flat top to the bed floor. The system further includes a removable vehicle bed liner that is adapted to line the vehicle bed. A body of the bed liner is molded from an elastomeric material. A plurality of cushioning elements are integrally molded with the liner body to downwardly depend from a bottom surface thereof. First arrays of the cushioning elements are laterally collocated with respective flat tops of the vehicle bed ribs. Second arrays of the cushioning elements are laterally collocated with flat areas of the floor spaced from the vehicle bed ribs. None of the cushioning elements rests on a sloped side of a bed rib. This allows the bed liner to "float" or laterally shift due to thermal expansion and contraction.

In one embodiment, the liner body has a substantially uniform thickness between its top and bottom surfaces. Each cushioning element has a bottom margin and a uniform depth between the bottom surface of the liner body and the bottom margin. The liner body forms a plurality of upwardly protruding liner ribs on the top surface of the body which can be analogs of the vehicle bed ribs.

In an embodiment alternative to the one immediately above, the liner body has a substantially uniform thickness between its top and bottom surfaces. The body has a plurality of upwardly protruding liner ribs formed its top surface which are not spatial analogs of the ribs in the vehicle bed. To make this happen, the depths of the cushioning elements, between the bottom surface of the liner body and their respective bottom margins, are made to be variable. In this way, the liner ribs may assume different directions, widths and shapes from the directions, widths and shapes of the bed ribs, while still providing uniform support to the body of the liner.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
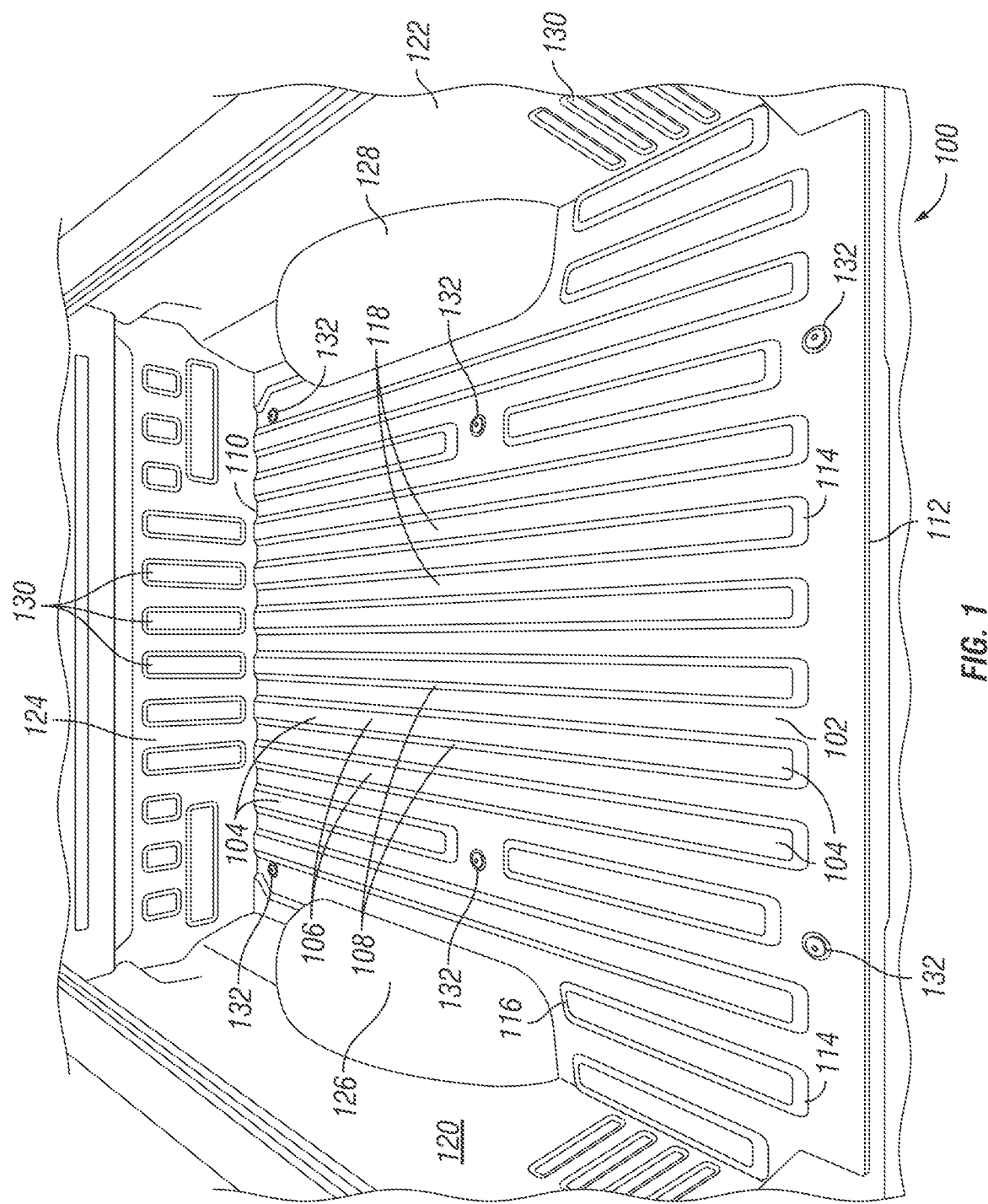
FIG. 1 is a rear perspective view of a pickup truck bed for which a liner according to the invention has been furnished, prior to installation of a bed liner according to the invention.

A bed 100 of a 2021 Ford F150 pickup truck is shown in FIG. 1. The invention of course has application to other makes and models of pickup trucks and vehicles more generally. Typically bed 100 is stamped and coated steel. A bed floor 102 of the bed 100 substantially resides in a horizontal plane. A set of spaced-apart bed ribs 104 protrude upwardly from the bed floor 102. Each rib 104 has a top flat surface 106 and, disposed between flat top 106 and floor 102, sloped sides 108. Suitable curved transitions are made between the bed floor 102, the sloped sides 108 and the rib top surfaces 106.

The pattern, size and orientation of ribs 104 vary from one vehicle model to the next. In the illustrated embodiment the bed ribs are elongate, parallel to each other, are arranged in a longitudinal or fore and aft direction, and stretch for most of the distance between a front end 110 of the bed to a rear end 112 thereof. Each bed rib 104 may have a somewhat rounded rear end 114 and some of them may have a somewhat rounded front end 116, each formed by a surface that joins a sloped side 108 on one side of the bed rib 104 to an opposed sloped side 108. In the illustrated embodiment, a width, in a transverse or side-to-side direction, of the flat tops of most of the bed ribs 104 is similar to the width of the valleys 118 extending between bounding sloped surfaces.

The bed 100 is laterally surrounded on at least three sides by cargo area walls. In this embodiment a left side of bed 100 is delimited by left wall 120, a right side of bed 100 is delimited by right wall 122, and a forward side of bed 100 is defined by a vertical front wall 124. A left wheel well 126 inwardly extends from left wall 120, while a right wheel well 128 inwardly extends from right wall 122. Ones of the walls 120, 122, 124 may have corrugations 130 that emulate the pattern made by bed ribs 104. In the illustrated vehicle, some of the bed ribs 104 are interrupted at the locations of six convex bolt heads 132, which are used to attach the bed 100 to the frame of the truck.

Figure 2:
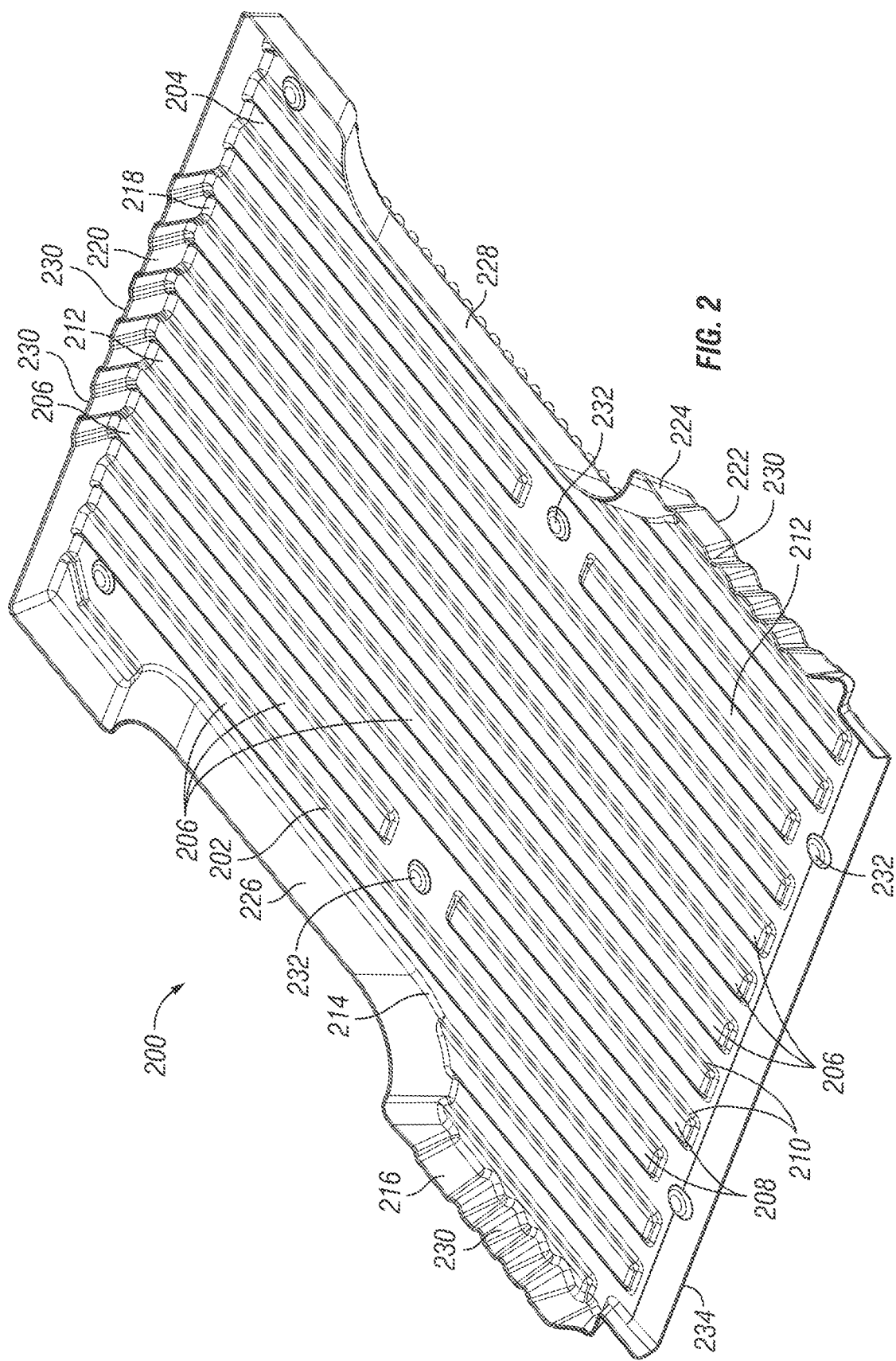
FIG. 2 is a top perspective view of a first embodiment of a bed liner according to the invention.
Figure 3:
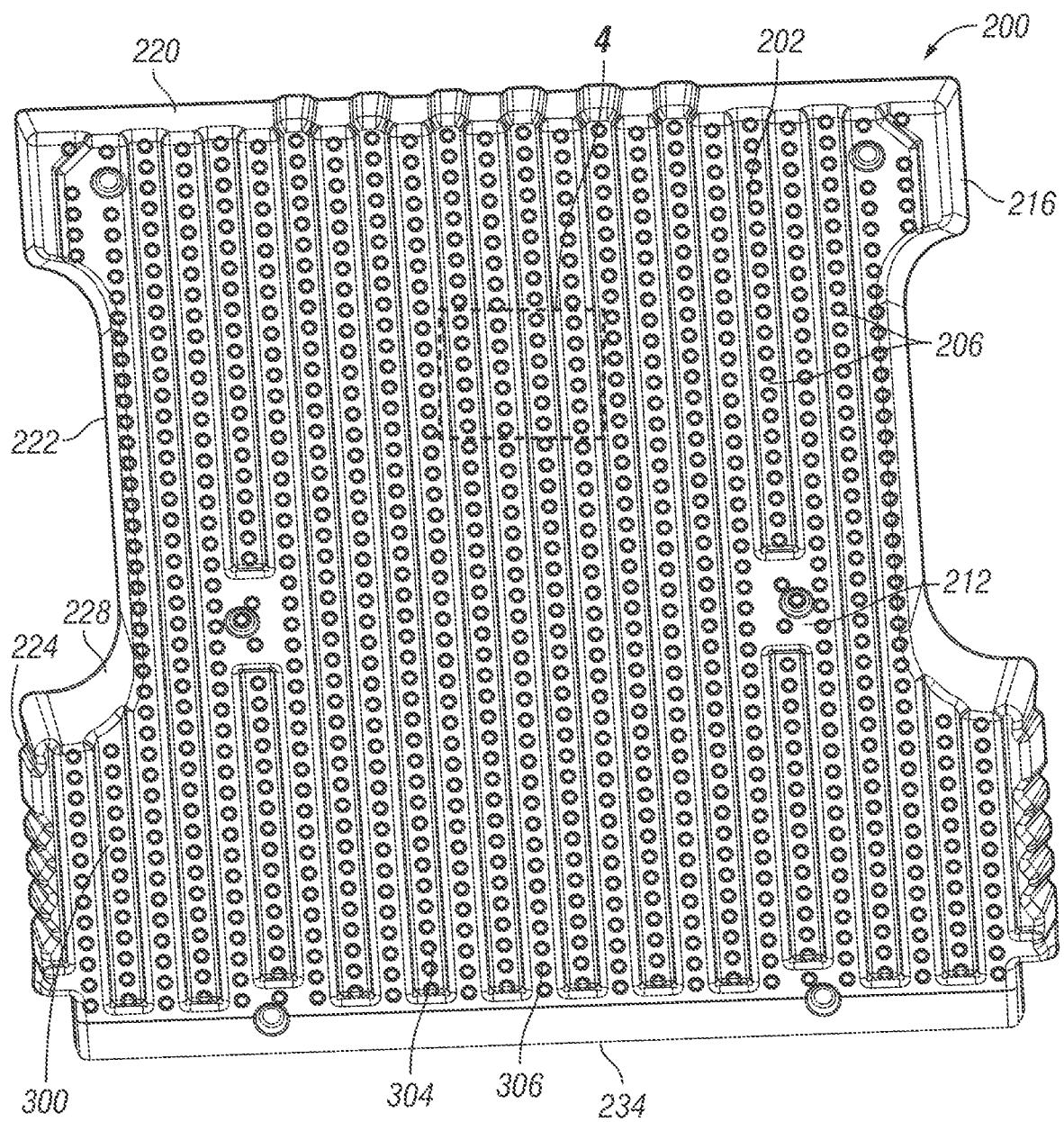
FIG. 3 is a bottom perspective view of the bed liner shown in FIG. 2.

FIG. 2 illustrates a bed liner 200 that is custom-molded to fit to the truck bed 100. A body 202 of the bed liner 200 is integrally molded of a polymer, and preferably an elastomer. The body may be injection-molded of a thermoplastic compound and preferably this compound is a thermoplastic elastomer. The body 202 conforms in a general way to a horizontal plane and has an upper surface 204. Body 202 is corrugated with a plurality of liner ribs 206. In the embodiment illustrated in FIG. 2, each liner rib 206 is elongate, is arranged in a longitudinal or fore-and-aft direction, and is disposed to be in parallel to adjacent ones of the liner ribs 206. Each liner rib 206 has a flat, horizontal top 208 and inclined sidewalls 210 which connect the top 208 to a flat liner floor 212. Suitable curved transitions are made between the top 208 and the sidewalls 210, and between the inclined sidewalls 210 and the floor 212.

In this illustrated embodiment, each liner rib 206 is an upwardly translated analog of a bed rib 104 that, in use, will be disposed immediately underneath it. The lengths and widths of ribs 104 and 206 are the same, as are their lateral placements. The pattern of ribs 206 duplicates the pattern of bed ribs 104. Inclined sidewalls 210 match, in their slopes and extents, the sloped sides 108 of the underlying bed ribs 104.

The liner body 202 has a left margin 214 from which upwardly extends a left wall 216. Similarly, the body 202 has a front margin 218 from which upwardly extends a front wall 220, and a right margin 222 from which upwardly extends a right wall 224. The left wall 216 conforms to left wall 120 of the truck bed 100, and includes a left wheel well portion 226 that conforms to left wheel well 126. The right liner wall 224 conforms to right wall 122 of the truck bed 100, and includes a right wheel well portion 228 that conforms to the right wheel well 128. Corrugations 230 may be made in liner walls 216, 220 and 224 that will match in many places the corrugations 130 made in the side walls of the pickup truck bed.

In a further emulation of the surface of pickup truck bed 100, some of the liner ribs 206 are interrupted. Small domes 232 are collocated with, and respectively fit over, the bolt heads 132. In the illustrated embodiment, a rear margin 234 of the liner 200 has no wall upwardly extending from it, but terminates in a flat edge for easy access to the truck bed.

A bottom surface 300 of liner body 202 is shown in FIG. 2. A large number of cushioning elements 302 each downwardly depends from lower surface 300. Each cushioning element 302 is laterally spaced from all neighboring cushioning elements. First arrays 304 of the cushioning elements downwardly extend from the bottom surfaces of the flat areas of ribs 206, while second arrays 306 of the cushioning elements downwardly extend from flat areas of the liner floor 212. The first arrays 304 are interleaved with the second arrays 306. Since the elements 302 are spaced apart from each other, they will not add much resistance to the liner 200 being rolled up for distribution to the consumer.

Figure 4:
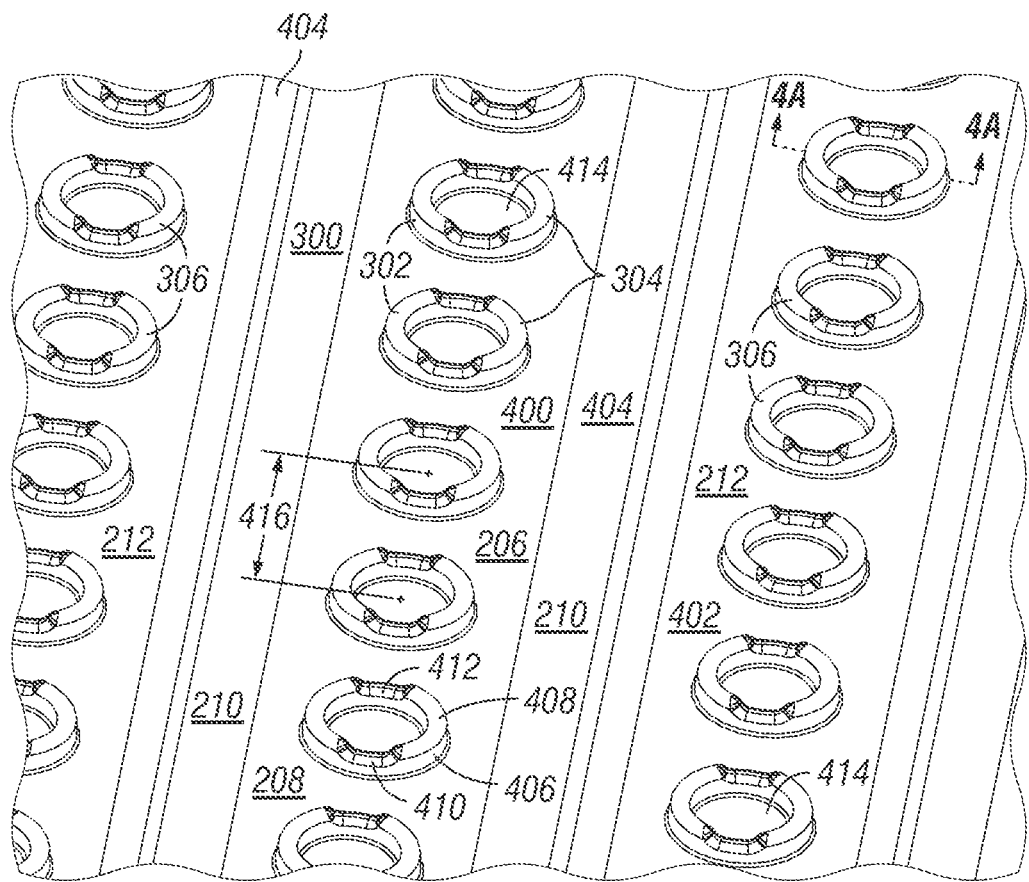
FIG. 4 is a bottom perspective detail of the bed liner shown in FIGS. 2 and 3, showing arrays of cushioning elements.
Figure 5:
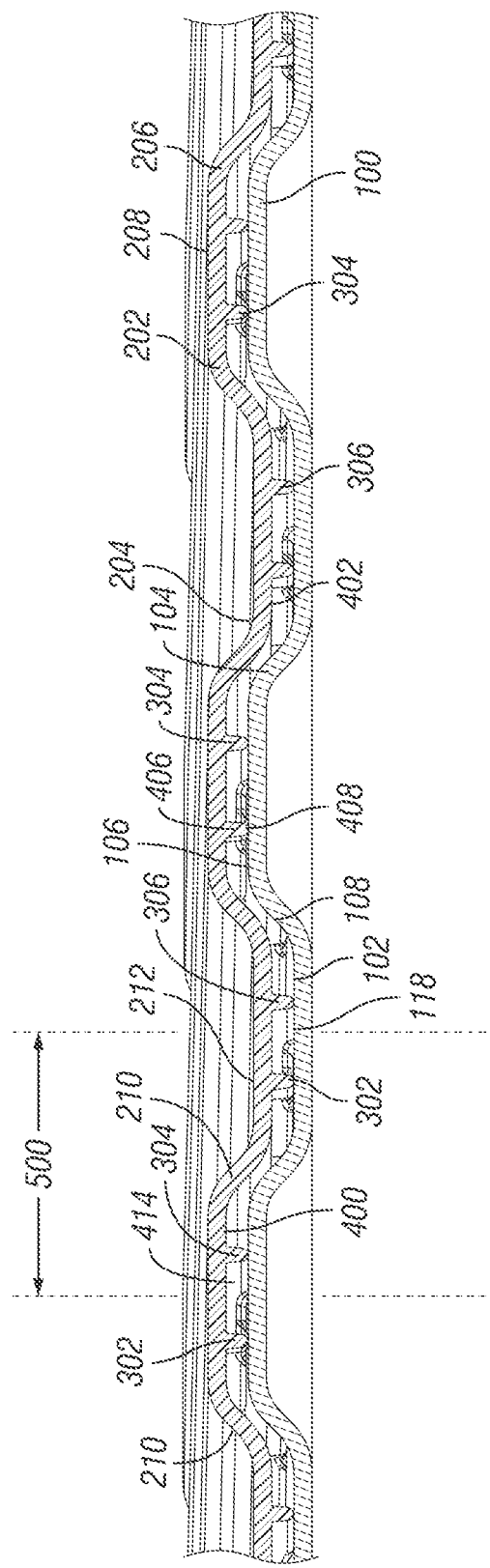
FIG. 5 is a cross sectional view of the liner of FIGS. 2-4 as installed in a pickup truck bed.

As seen in the bottom detail of FIG. 4 and the sectional detail of FIG. 5, cushioning elements 302 within a first array 304 downwardly extend (upwardly in this FIGURE) from bottom surfaces 400 of the rib flat areas 208. Cushioning elements 302 belonging to second arrays 306 downwardly extend from flat bottom surfaces 402 of liner floor 212. In one embodiment, none of the cushioning elements 302 downwardly depends from any sloped bottom surface 404 of rib sidewalls 210.

As molded from a TPE, the thickness of the liner floor 212 may be about 0.160 inches. Where the truck bed 100 is stamped from aluminum or steel, its thickness will be much less than that of liner floor 212, and the thickness of truck bed 100 conveyed by FIG. 5 should be considered to be schematic rather than dimensionally accurate.

Each cushioning element 302 is integrally molded with liner body 202. Each cushioning element is endless in a horizontal plane, and in the illustrated embodiments the elements 302 are circular. In other embodiments the elements 302 could take other endless shapes such as squares, rectangles or ovals.

Figure 4A:
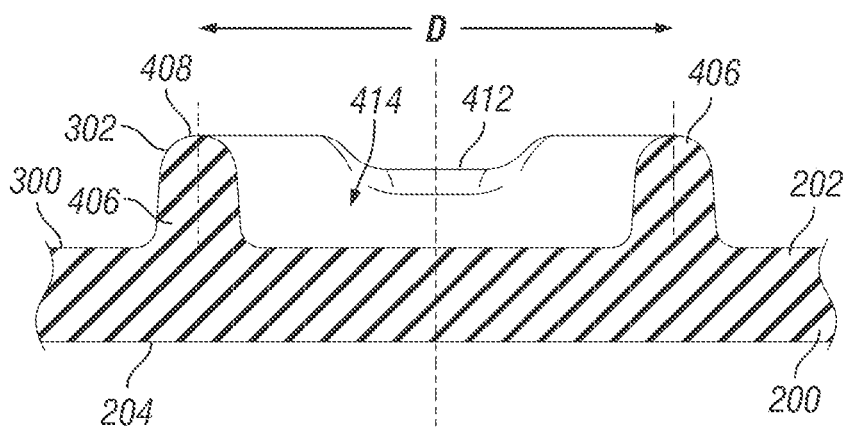
FIG. 4A is an enlarged sectional detail taken substantially along Line 4A-4A of FIG. 4.

Each cushioning element 302 has a sidewall 406 that downwardly extends from liner body bottom surface 300 to a cushioning element bottom margin 408. The bottom margin 408 conforms to a horizontal plane. In the embodiment shown in FIGS. 4 AND 4A, the bottom margin 408 is not endless but rather is interrupted by at least one notch 410, and in the illustrated embodiment by a second notch 412. Notch 412 is angularly spaced from notch 410 and in the illustrated embodiment is spaced away from notch 410 by 180 degrees. The purpose of notches 410 and 412 is to permit ingress and egress of fluid (liquid or gas) from an interior 414 of the element 302 defined by sidewall 406. Otherwise, when liner 200 is placed in truck bed 100, the cushioning elements 302 will seal to the bed floor 102 and the bed ribs 104, creating a suction cup effect. This would make the liner 200 difficult to remove from the truck bed 100. Further, notches 410 and 412 permit the drainage of any liquid that might otherwise remain in cushioning element interior 414, mitigating corrosion of the truck bed by e.g. trapped water.

In the embodiment shown in FIGS. 4 and 5, the depths of the element sidewalls, as measured between lower surface 300 and bottom margin 408, is uniform, notches 410 and 412 being excepted. Since, apart from cushioning elements 302, body 202 otherwise has a substantially uniform thickness, this means that each liner rib 206 will be upwardly displaced from a respective bed rib 104 by a distance that is the same as the displacement of each floor flat area 402 above liner floor 104. This ensures that the upper surface 204 of liner 200 will be a mathematical upward projection of bed floor 102 and bed ribs 104.

The purpose of the cushioning elements 302 is to cushion the truck bed 100 from impacts of heavy objects dropped onto the top surface 204 of the liner 200. To do a good job of this, the cushioning elements 302 should be so arranged as to accept all of the load of such impacts, no matter where they occur on the top surface. Therefore, the elements 302 should not be so far away from each other that an impact would be directly transmitted to the bed floor 104 without the force of the impact going through them.

The cushioning elements 302 create an air gap between the truck bed 100 and the lower surface 300 of liner 200. An object impacting the upper surface 204 of the liner may impact the upper surface directly above the sidewall 406 of an element 302, or at a point above the hollow interior 414 of element 302, or between adjacent elements 302, or combinations of all three of these possibilities for large impacting objects. In any case, the heavy object's progress down toward the truck bed is decelerated by the cushioning elements 302 and by the liner body 202 itself.

The cushioning elements 302 are placed with sufficient density that even a heavy object striking between adjacent cushioning elements 302 would need to compress two or more of them in order for the bottom surface 300 of the liner to bottom out on the truck bed 100 and possibly cause damage. In one embodiment, an approximate formula may be used to determine this density. If D is a horizontal diameter, taken through the axis of a cushioning element from a point on the centerline of sidewall 406 to the opposed point on centerline of sidewall 406 (see FIG. 4A), then the cushioning elements may be placed on axes that are about 1.5D-2D apart to be sufficiently dense to adequately support the bridging flat web between the elements. Diameter D must also be not so great as to allow easy compression of the liner body 202 to the truck bed 100 from an impact on the element axis. In the embodiment illustrated in FIGS. 4-5, diameter D is about 0.8 inch while distance 416 is about 1.5 inches. More generally, distance 416 may be chosen within the range of about 1.0 to about 12.0 inches. A distance 500 between the axis of a cushioning element 302 in an array 304, to an axis of the closest cushioning element in an adjacent array 306, can be from 2 to 3 inches. In the illustrated embodiment, distance 500 is about 2.4 inches.

From one make and model to the next, the bed ribs 104 will vary in width and separation. In some models, each array 304 and/or array 306 may consist of two or more rows of elements 302 rather than one. If a rib or valley is sufficiently wide, then multiple rows of elements may be used, preferably spaced apart at the 1.5D-2D index.

It is preferred that each cushioning element be sited on the truck bed floor 102 or on a flat area 106 of a truck bed rib 104. This is so that the liner may "float" as a function of thermal expansion and contraction. Liner 200 will be exposed to direct sunlight and will heat up, and consequently expand in width and length, at a rate faster than the expansion of the metal truck bed itself. Placing the elements 302 only on flat areas accommodates lateral shifting. On the other hand, if elements 302 were placed on inclined surfaces, the liner would have a tendency to rise during thermal expansion and no longer aesthetically conform to the shape of the truck bed 100.

Upon receiving an impact, the sidewall 408 of the cushioning element will elastically deform, absorbing some of the force of the impact. To accommodate such deformation, the sidewall 408 can be from 0.125 to 0.500 inch deep and from 0.080 to 0.250 inch thick. In one embodiment, the depth of element sidewall 408 can be 0.188 inch deep and 0.144 inch thick. Making the sidewall 408 endless also gives it greater resistance to folding over upon impact; it will flatten around the element's axis and then rebound.

Figure 6:
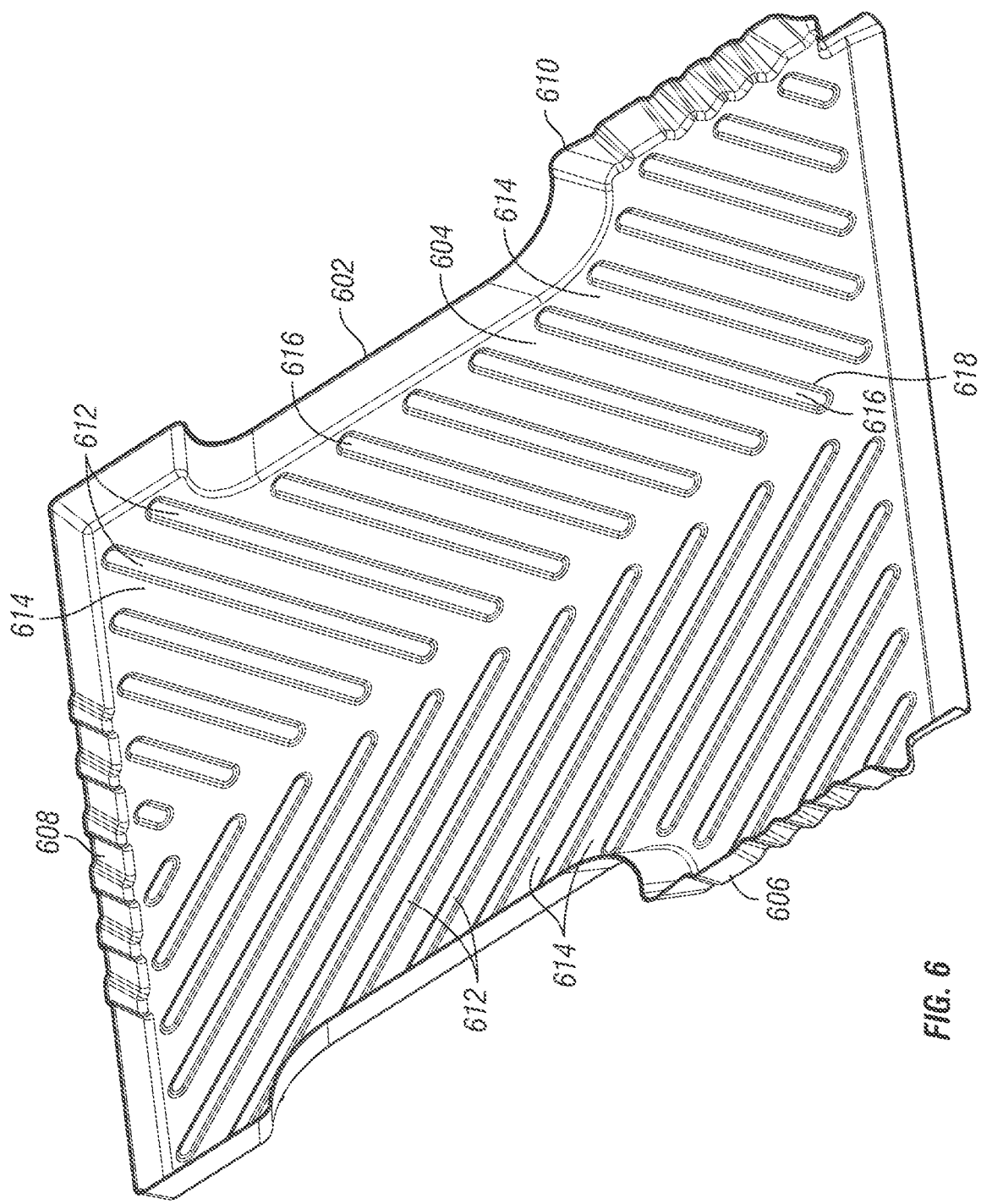
FIG. 6 is a top perspective view of a second embodiment of a bed liner according to the invention.

Another embodiment of a liner according to the invention is shown in FIG. 6. This liner 600 is meant to be installed into the same make and model of vehicle as liner 200, i.e., a 2021 Ford F150 pickup truck. Liner 600 has a body 602 with a liner floor 604. Liner left, front and right sidewalls 606, 608 and 610 can be identical to liner sidewalls 216, 220 and 224. As before, a plurality of ribs 612 upwardly extend from floor 604. But these ribs 612 do not match bed ribs 104. Instead, ribs 612 are positioned diagonally. What this means is that the ribs 612 will cross both the bed ribs 104 and the bed floor valleys 108, as will the flat areas 614 of liner floor 604 in between ribs 612. The ribs 614 each have a central flat area 616 and a surrounding, sloped sidewall 618 that connects area 616 to the surrounding liner floor 604.

Figure 7:
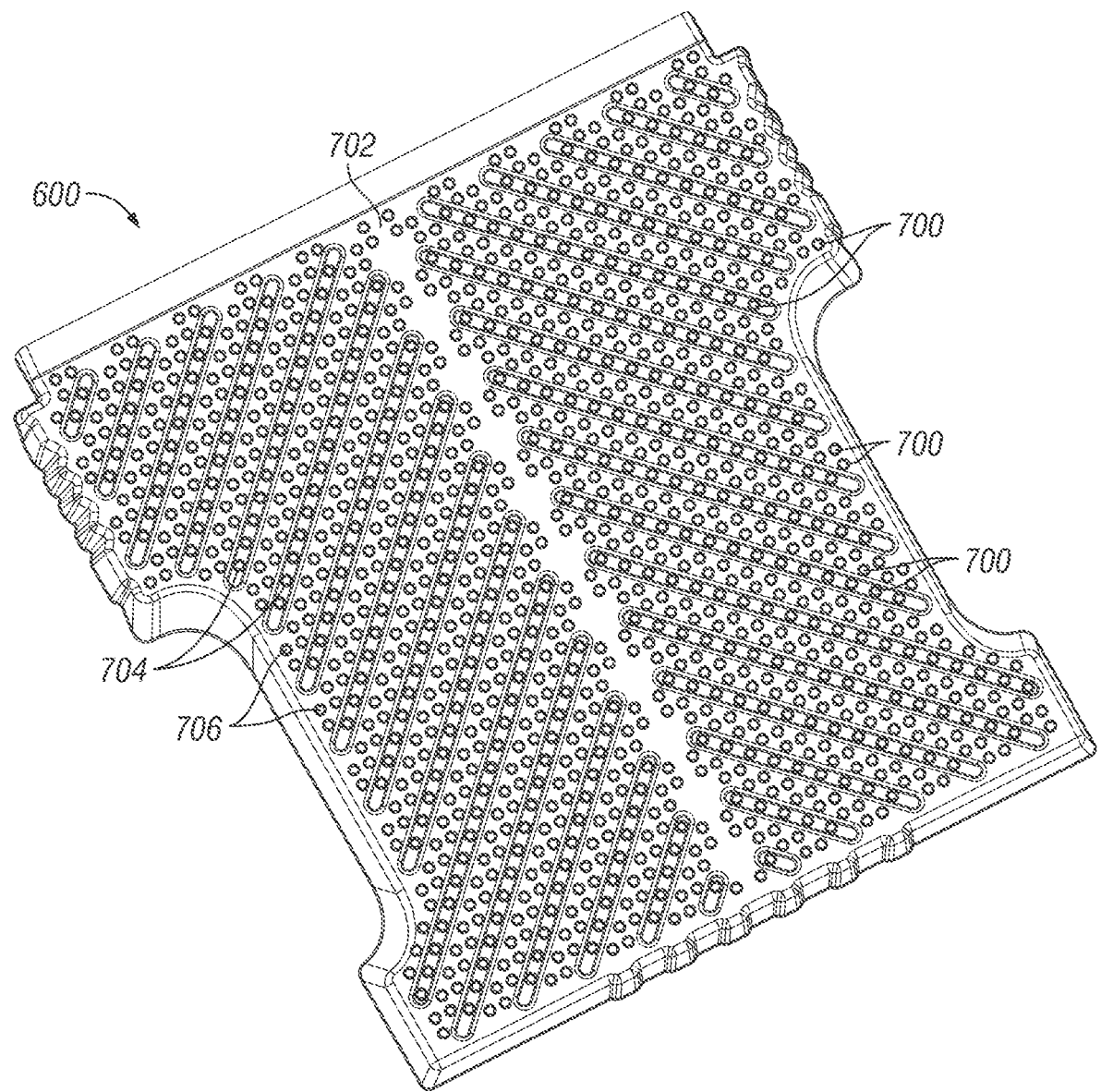
FIG. 7 is a bottom perspective view of the embodiment shown in FIG. 6.

As seen in the bottom perspective view of FIG. 7, a plurality of cushioning elements 700 downwardly depend from a lower surface 702 of liner 600. First arrays 704 of the elements 700 downwardly depend from the lower surfaces of the flat areas of ribs 612. Second arrays 706 of the elements 700 will downwardly depend from the lower surfaces of flat floor areas 614. As before, the cushioning elements are sited so as to avoid downwardly depending from a sloping rib sidewall 618. In this embodiment, the first arrays 704 are each single rows of elements 700. The second arrays on the other hand are each formed of two rows of elements 700, so as to provide an appropriate element density.

Figure 8:
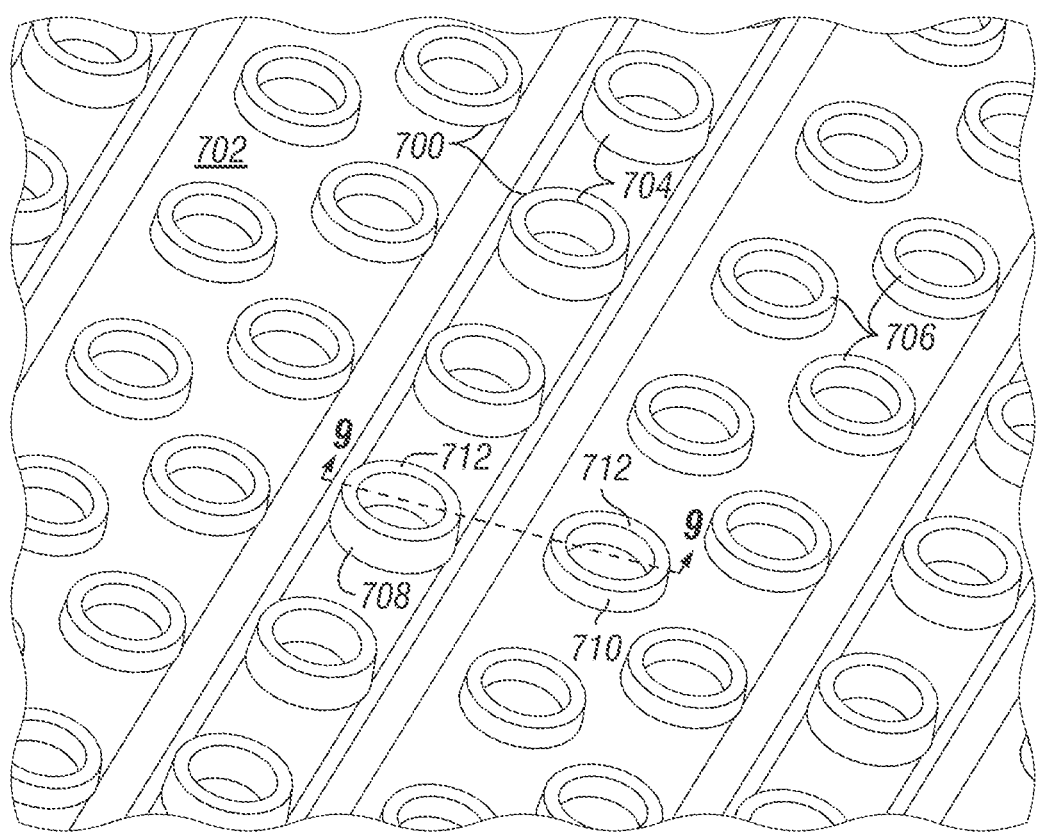
FIG. 8 is a bottom perspective detail of the bed liner shown in FIGS. 6 and 7, showing an array of alternative cushioning elements.
Figure 9:
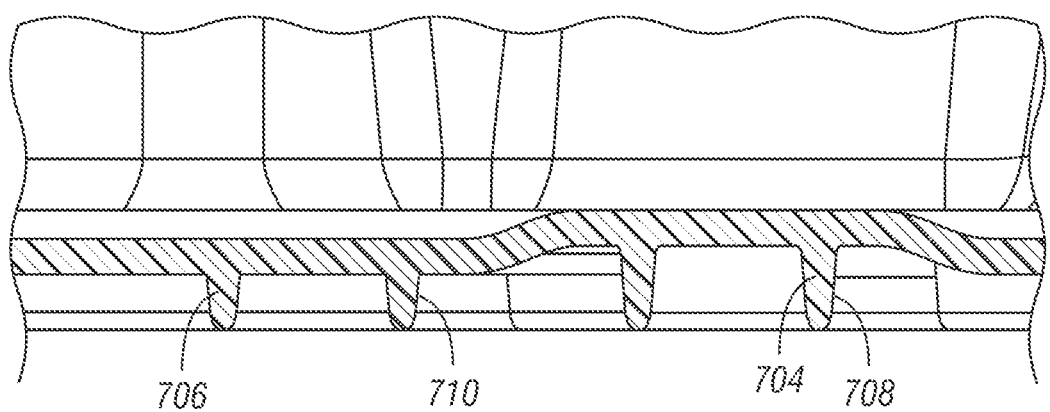
FIG. 9 is a cross-sectional view taken substantially along Line 9-9 of FIG. 8.

As seen in the bottom detail of FIG. 8, the elements 700 are circular and are spaced apart from each other. The illustrated elements 700 each have a sidewall 708, 710 that downwardly extends from the lower surface 702 to an element bottom margin 712. In this illustrated embodiment, the sidewalls 708, 710 do not have notches in them like notches 410 and 412, although these could be easily supplied. Unlike sidewalls 406 of elements 302, the sidewalls 708, 710 are not uniform in depth. Sidewall 708, for example, is relatively deep. Sidewall 710 on the other hand is relatively shallow.

The sidewall depths 708, 710 are intentionally varied so as to firmly support the central flat areas 616 of the ribs 612 in a single horizontal plane. This is because some elements in any array 704 will be contacting the top surface of a bed rib 104, while others in any array 704 will be contacting the top surface of a bed valley 118, and those two surfaces are vertically separated from each other. Similarly, some elements 700 in any array 706 will be contacting the top surface of a bed valley 118, while other elements in an array 706 will be contacting the top surface of a truck rib 106. The cushioning elements 700 are so positioned that they will avoid both the sloped sides 108 of the truck bed ribs 104, and the inclined sidewalls 618 of the liner ribs 612.

By varying element sidewall depth, the designer no longer has to emulate the truck bed rib pattern, but instead may freely incorporate any pattern in the liner upper surface that the designer desires.

In summary, drop-in truck bed liners have been illustrated and described that include plural spaced-apart cushioning elements on their lower surfaces. The liners may be rolled up, are not too bulky, but yet provide excellent protection of the truck bed against impact on the liners' upper surfaces.

While embodiments of the present invention have been described in the above detailed description and illustrated in the appended drawings, the present invention is not limited thereto but only by the scope and spirit of the appended claims.

We claim:

1. A vehicle bed liner comprising:
a body integrally molded of an elastomer, the body having a top surface and an opposed bottom surface; and
a two-dimensional array of cushioning elements downwardly depending from the bottom surface of the body and being integrally molded with the body, each of the cushioning elements being a first cushioning element having at least one neighboring second cushioning element spaced from the first cushioning element in a longitudinal direction, and having at least one third cushioning element spaced from the first cushioning element in a transverse direction at an angle to the longitudinal direction; each cushioning element comprising a sidewall which is endless in a horizontal plane, the sidewall defining a downwardly open hollow interior.

2. The vehicle bed liner of claim 1, wherein the elastomer is a thermoplastic elastomer and the body is molded by injection-molding.

3. The vehicle bed liner of claim 1, wherein the vehicle bed liner is a pickup truck bed liner.

4. The vehicle bed liner of claim 1, wherein each cushioning element has a bottom margin, each cushioning element downwardly extending from the lower surface of the body to the bottom margin by a uniform depth.

5. The vehicle bed liner of claim 4, wherein the body has a substantially uniform thickness, apart from the cushioning elements, between the top surface and the bottom surface thereof, the uniform depth of each cushioning element being substantially similar to the thickness of the body.

6. The vehicle bed liner of claim 1, wherein the body has a peripheral edge, a lip integrally molded with the body to stand up from the peripheral edge.

7. A vehicle bed liner comprising:
a body integrally molded of an elastomer, the body having a top surface and an opposed bottom surface; and
a plurality of cushioning elements downwardly depending from the bottom surface of the body and being integrally molded with the body, each of the cushioning elements being spaced from all of the other cushioning elements, wherein each of the cushioning elements comprises a sidewall which is endless in a horizontal plane, the sidewall defining a downwardly open hollow interior.

8. The vehicle bed liner of claim 7, wherein each of the cushioning elements is circular in a horizontal plane.

9. A vehicle bed liner comprising:
a body integrally molded of an elastomer, the body having a top surface and an opposed bottom surface; and
a plurality of cushioning elements downwardly depending from the bottom surface of the body and being integrally molded with the body, each of the cushioning elements being spaced from all other cushioning elements, wherein each of the cushioning elements comprises a sidewall which is endless in a horizontal plane, each of the cushioning elements being circular in the horizontal plane; wherein each cushioning element is formed around a vertical axis, vertical axes of next adjacent ones of the cushioning elements being spaced apart from each other by a distance in the range of about 1.0 to about 2.0 inches.

10. A vehicle bed liner comprising:
a body integrally molded of an elastomer, the body having a top surface and an opposed bottom surface; and
a plurality of cushioning elements downwardly depending from the bottom surface of the body and being integrally molded with the body, each of the cushioning elements being spaced from all other cushioning elements, wherein each of the cushioning elements comprises a sidewall which is endless in a horizontal plane, each of the cushioning elements being circular in the horizontal plane; wherein each cushioning element is formed around a vertical axis and wherein the sidewall is formed around a centerline, each cushioning element having a diameter D measured through the axis and to opposed points on the centerline, vertical axes of next adjacent ones of the cushioning elements being spaced apart from each other by a distance selected from the range of 1.5D to 2D.

11. A vehicle bed liner comprising:
a body integrally molded of an elastomer, the body having a top surface and an opposed bottom surface; and
a plurality of cushioning elements downwardly depending from the bottom surface of the body and being integrally molded with the body, each of the cushioning elements being spaced apart from all of the other cushioning elements, wherein each of the cushioning elements comprises a sidewall which is endless in a horizontal plane; wherein the sidewall of each of the cushioning elements downwardly extends from the bottom surface of the body to a bottom margin of the cushioning element, the bottom margin conforming to a horizontal plane, at least one notch being formed in the sidewall such that the bottom margin of the sidewall is not continuous, such that, when the cushioning elements are resting on a vehicle bed, an interior of the cushioning element defined by the sidewall will not be sealed to the vehicle bed, the at least one notch instead permitting the ingress and egress of fluid to and from the interior.

12. The vehicle bed liner of claim 11, wherein each cushioning element is formed around a vertical axis, the sidewall having a plurality of notches angularly spaced from each other around the vertical axis.

13. A vehicle bed liner comprising:
a body integrally molded of an elastomer, the body having a top surface and an opposed bottom surface; and
a plurality of cushioning elements downwardly depending from the bottom surface of the body and being integrally molded with the body, each of the cushioning elements being spaced from all of the other cushioning elements; wherein a thickness of the body between the top surface and the bottom surface thereof is substantially uniform, the bed liner adapted to line a vehicle bed having a bed floor and a plurality of vehicle bed ribs in a vehicle bed rib pattern, each vehicle bed rib upwardly extending from the bed floor, the top surface of the body of the bed liner having a plurality of second ribs in a second rib pattern that is not the same as the vehicle bed rib pattern, each second rib upwardly extending from a respective surrounding portion of the top surface of the body, each cushioning element having a bottom margin and a depth between the bottom surface of the body and the bottom margin, the depths of the cushioning elements not being uniform with respect to each other but varying so that the bottom surface of the body is supported by a varying height from the vehicle bed and so that the second rib pattern can be different from the vehicle bed rib pattern while maintaining the uniformity of thickness of the body.

14. A vehicle bed/vehicle bed liner system comprising:
a vehicle bed having a vehicle bed floor substantially disposed in a horizontal plane and having an upper surface, a plurality of spaced-apart elongate bed ribs upwardly extending from the bed floor, each bed rib having a flat top and sloped sides that are disposed between the flat top of the bed rib and the bed floor; and
a removable vehicle bed liner adapted to line the vehicle bed, a body of the bed liner molded from an elastomeric material, the body having a bottom surface for disposal near the vehicle bed and a top surface opposed to the bottom surface;
a plurality of cushioning elements integrally molded with the body and downwardly depending from the bottom surface, first arrays of the cushioning elements being laterally collocated with respective flat tops of the bed ribs, second arrays of the cushioning elements being laterally collocated with flat areas of the bed floor, no cushioning element being laterally collocated with a sloping side of a bed rib.

15. The system of claim 14, wherein each cushioning element is endless in a horizontal plane and wherein each cushioning element downwardly extends to a bottom margin of the cushioning element, the bottom margin of each cushioning element conforming to a respective horizontal plane, such that when a downward load is experienced above a cushioning element on the top surface of the body, the downward load will be equally distributed throughout the bottom margin of the cushioning element and will be transmitted by the bottom margin to a flat top of a bed rib or to a flat area of the bed floor with which the last said cushioning element is laterally collocated.

16. The system of claim 15, wherein each of the cushioning elements has an endless wall that downwardly extends from the bottom surface of the body to the bottom margin of the cushioning element, at least one notch being formed in the endless wall such that the bottom margin of the cushioning element is not continuous, such that, when the cushioning elements are resting on the vehicle bed, an interior of each cushioning element defined by the endless wall will not be sealed to the vehicle bed, the at least one notch instead permitting the ingress and egress of fluid to and from the interior.

17. The system of claim 14, wherein the vehicle bed liner is molded of a thermoplastic elastomer.

18. The system of claim 14, wherein each cushioning element is circular in a horizontal plane.

19. The system of claim 14, wherein the liner body has a substantially uniform thickness between the top surface and the bottom surface thereof, each cushioning element having a bottom margin and a depth between the bottom surface of the liner body and the bottom margin that is uniform among the cushioning elements, the liner body forming a plurality of upwardly protruding liner ribs on the top surface of the body which are analogs of the bed ribs.

20. The system of claim 14, wherein the liner body has a substantially uniform thickness between the top surface and the bottom surface thereof, the liner body having a plurality of upwardly protruding liner ribs on the top surface of the body which are not analogs of the bed ribs, each cushioning element having a bottom margin and a depth of between the bottom surface of the liner body and the bottom margin thereof, the depths of the cushioning elements being variable so as to permit the liner ribs to not be spatial analogs of the bed ribs.

21. The system of claim 14, wherein the liner is injection-molded.

22. The system of claim 14, wherein the vehicle bed is surrounded by cargo area walls of the vehicle, the liner including a peripheral lip upstanding from the liner body that substantially conforms to the cargo area walls.

* * * * *